United States Patent [19]
Kato

[11] Patent Number: 5,914,159
[45] Date of Patent: Jun. 22, 1999

[54] WATER-PROOFING STRUCTURE FOR A CASE

[75] Inventor: Manabu Kato, Hamamatsu, Japan

[73] Assignee: Asmo Co., Ltd., Kosai, Japan

[21] Appl. No.: 08/769,521

[22] Filed: Dec. 19, 1996

[30] Foreign Application Priority Data

Feb. 8, 1996 [JP] Japan ................................. 8-022838

[51] Int. Cl.$^6$ .............................. B32B 3/30; B32B 3/02
[52] U.S. Cl. ...................... 428/34.1; 428/60; 206/811; 220/4.01
[58] Field of Search ............................. 428/60, 58, 34.1; 220/4.01, 4.02, 4.31; 206/811

[56] References Cited

U.S. PATENT DOCUMENTS 4,919,987  4/1990  Manner ....................................... 428/60

FOREIGN PATENT DOCUMENTS

| 59-15251 | 1/1984 | Japan . |
| 63-197400 | 12/1988 | Japan . |
| 3-48346 | 5/1991 | Japan . |
| 6-29363 | 4/1994 | Japan . |

*Primary Examiner*—Alexander Thomas
*Attorney, Agent, or Firm*—Burns, Doane, Swecker & Mathis, LLP

[57] ABSTRACT

Indented grooves having a concavo-convex bottom respectively are formed on abutting surfaces of a case body and a case cover. The indented grooves constitute a sealant filling space when case body is engaged with case cover. Sealant filled in the space can have enough contacting area within a limited space with respect to the inner wall surfaces of the indented grooves, perfectly preventing water inflow from outside and obtaining pressure-resistance as well. A wall portion formed to extend in the axial direction prevents inflow of overflowing sealant from the sealant filling space into case body. Thus, without enlarging an overall size of the case, a water-proofing structure with good sealing property can be obtained.

14 Claims, 4 Drawing Sheets

WATER-PROOFING STRUCTURE FOR A CASE

BACKGROUND OF THE INVENTION

1. Field of the Invention

The present invention relates to a water-proofing structure, and more particularly relates to a water-proofing structure for a case containing electrical contacts or control circuits.

2. Description of Related Art

Electrical contacts for position detection or control circuits for a motor are integrally contained within a gear case in motors used for a vehicular power window or vehicular door-locking apparatus, for an overall compactness. In this type of motors, since there is a possibility of the motors getting wet, a perfect water-proof of the gear case is required. In addition, since temperature rises within the case when the motor is in operation and lowers when the motor is not in operation, negative pressure might be generated therein due to this temperature changes. Therefore, it is also necessary to ensure water-proofing in order to prevent water inflow from the outside to the inside of the case.

JP-U-6-29363 discloses, for example, a structure wherein sealant receiving grooves are provided on the abutting surfaces of the case body and the case cover respectively, and viscous resin sealant is filled therein for water-proofing.

However, in this conventional water-proofing structure, the sealant overflows largely from the abutting portion where the case body and the case cover meet. Here, butyl rubber can be normally used as sealant for example. However, when the rubber enters in large amount into the case, the rubber might adhere to the electrical contacts provided in the case resulting in blocking the electrical conduction, for the butyl rubber is a good insulating material.

Also, in order to improve the sealing property, it is required to secure a large enough contacting area in the abutting surfaces for the sealant sandwiched. However, since the conventional water-proofing structure can not have the other way than enlarging the abutting surface area where the case body and the case cover meet, the case has to be designed larger in an overall size.

SUMMARY OF THE INVENTION

In light of the above-described problems, the present invention has an object of providing a water-proofing structure for a case having good sealing property without enlarging the overall size of the case, and also preventing sealant inflow into the case.

According to the present invention, sealant enclosing portions and a wall portion are both provided at an abutting portion where a case body and a case cover meet.

The sealant is filled into a sealant filling space formed by sealant enclosing portions at the time of abutment of the case body and the case cover, so that water inflow into the case from outside is prevented perfectly. In addition, the sealant enclosing portions are designed to have a large enough contacting area with the sealant so that the water-proofing is perfected without enlarging the overall size of the case. Even if there occurs a negative pressure generated within the case, there will be no water inflow into the case from outside due to suction.

In addition, the sealant overflowing from the sealant filling space will not cause malconduction or the like which would be caused by the sealant adhesion to the electrical contacts contained within the case, since the wall portion prevents the sealant from flowing into the inside of the case.

Preferably, an indented groove portion is provided on each abutting surface of the case body and the case cover so as to form the sealant filling portion at the time of abutment. A concavo-convex portion is formed on the bottom of each indented groove.

By providing this kind of concavo-convex portion formed on the bottom of the indented grooves, enough contacting area with the sealant is secured within a limited space. Even if the sealant is not filled perfectly, the possibility of water inflow along the abutting portion will be reduced by far compared with the case in which the indented groove is designed to have a flat bottom.

BRIEF DESCRIPTION OF THE DRAWINGS

Other objects, features and characteristics of the present invention as well as the functions of related parts of the present invention will become clear from the following detailed description, the appended claims and the drawings. In the drawings:

DETAILED DESCRIPTION OF THE PREFERRED EMBODIMENTS

Figure 1:
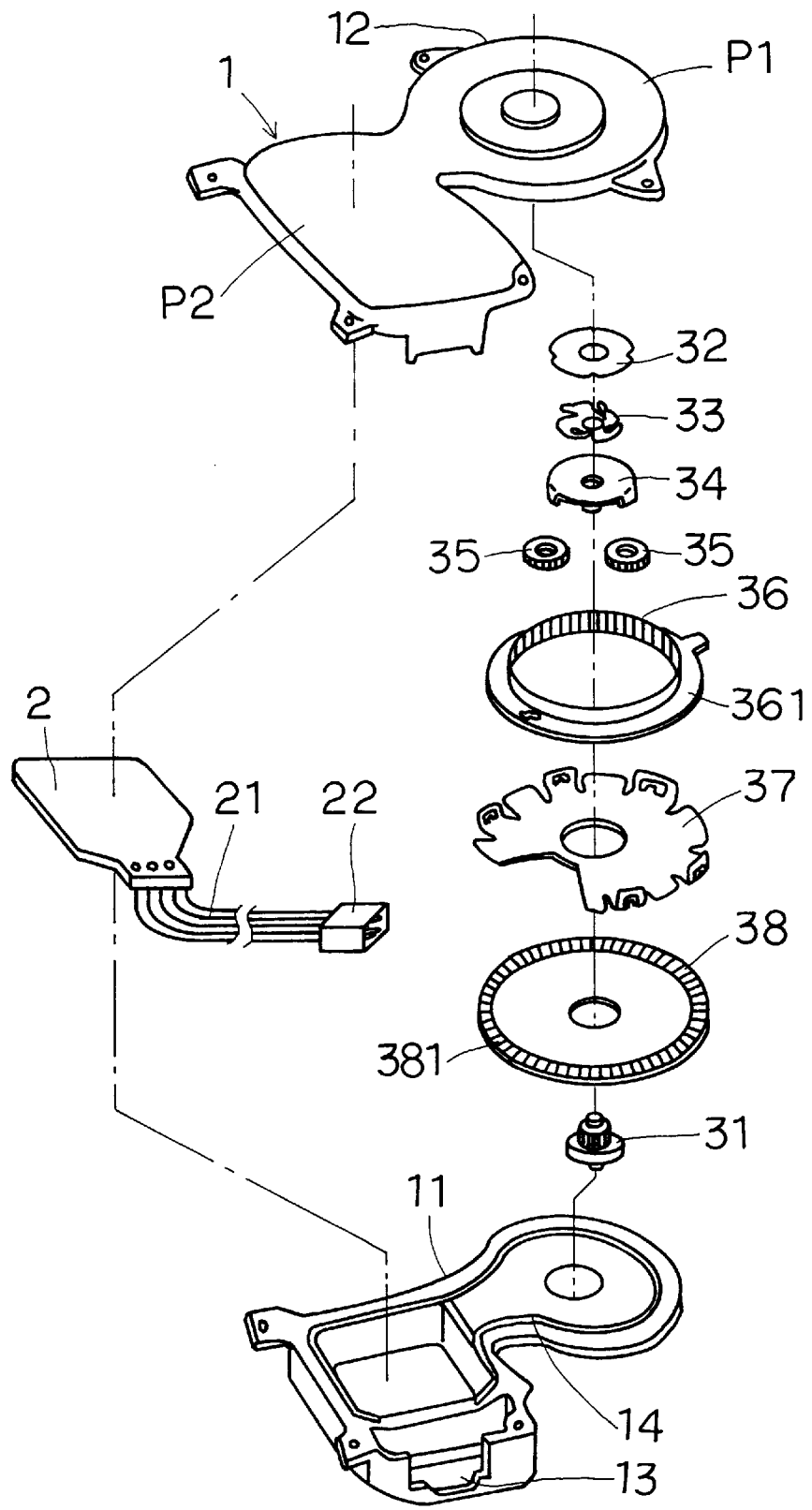
FIG. 1 is a perspective exploded view of a gear case to which a water-proofing structure according to a first embodiment of the present invention is applied.

A gear case 1 is comprised of a case body 11 and a case cover 12 to be fitted with case body 11 by covering from the upper side. A disc-shaped gear containing portion P1 (shown in FIG. 2) and a rectangular circuit containing portion P2 are integrally and hermetically formed by abutting case body 11 with case cover 12. A printed wiring substrate 2 having motor controlling electric circuits thereon is contained in circuit containing portion P2. A numerous electrical leader lines 21 of printed wiring substrate 2 extend from a take-out opening 13 to the outside of gear case 1, and a connector 22 is attached to the tips of leader lines 21. Opening 13 is sealed by way of resinous hot-melt coating.

Figure 2:
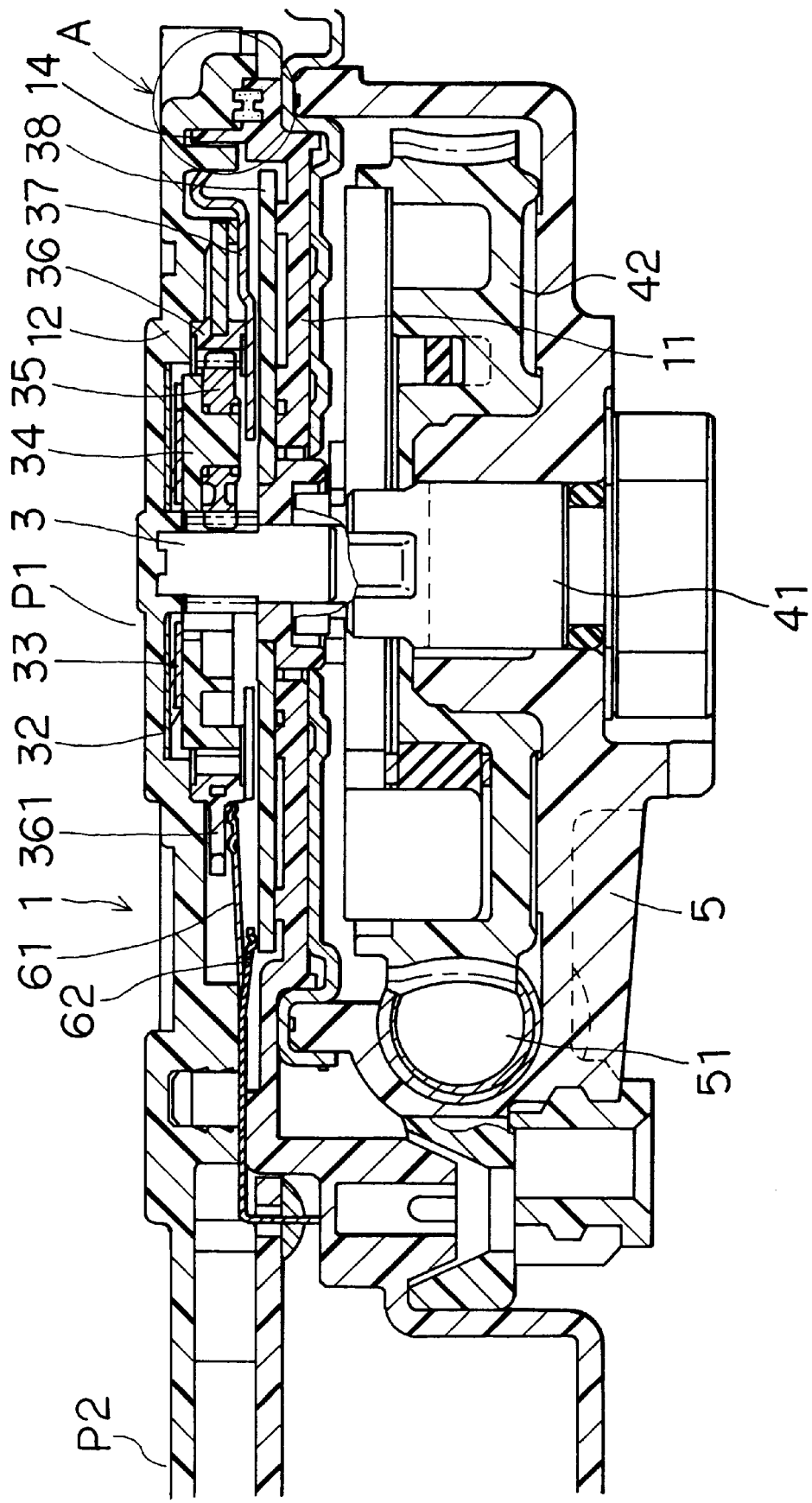
FIG. 2 is a partially-cut enlarged sectional view of a major part of the gear case to which the water-proofing structure according to the first embodiment of the present invention is applied.

A sun gear 31 is disposed rotatably in the center of gear containing portion P1 and its axial lower end is connected to a motor output shaft 41 (shown in FIG. 2). Motor output shaft 41 is inserted and fitted to the center of a helical gear 42 (worm decelerating portion) within a motor case 5 which is combined right under gear containing portion P1. Helical gear 42 is meshed with a worm gear 51 on a motor rotor (armature) so as to decelerate the rotational speed of the motor and convey the decelerated power to output shaft 41.

A plate 32 is positioned to encircle the periphery of sun gear 31 contacting the inner wall of case cover 12. A spring plate 33 is positioned between plate 32 and a gear base 34 which is fixed under the normal operation. Planetary gears 35 are rotatably mounted on a plurality of leg portions formed around the outer circumference of gear base 34 respectively. Planetary gears 35 mesh sun gear 31 as well as a ring gear 36 which is located radially outside.

The rim of ring gear 36 is formed as a flanged cam plate 361 so that a flat spring electrical contact 61 for rotational position detection contacts with the plate surface of cam plate 361 (shown in FIG. 2). A pulse plate 38 is provided in the axially downward direction of ring gear 36 by way of a plate 37, so that it rotates integrally with sun gear 31. A numerous electrodes 381 are formed on the outer circumference of pulse plate 38 with a space therebetween. Resilient leaf spring electrical contact 62 is provided on the current flowing route to contact electrodes 381. Pulse signals corresponding to the rotational speed of sun gear 31 are received accordingly.

As described, the outer circumferential abutting portion where case body 11 having printed wiring substrate 2 and electrical contacts 61 and 62 therein meet with case cover 12, has a cross-section as shown in a portion A of FIG. 2, except for opening 13.

Figure 3:
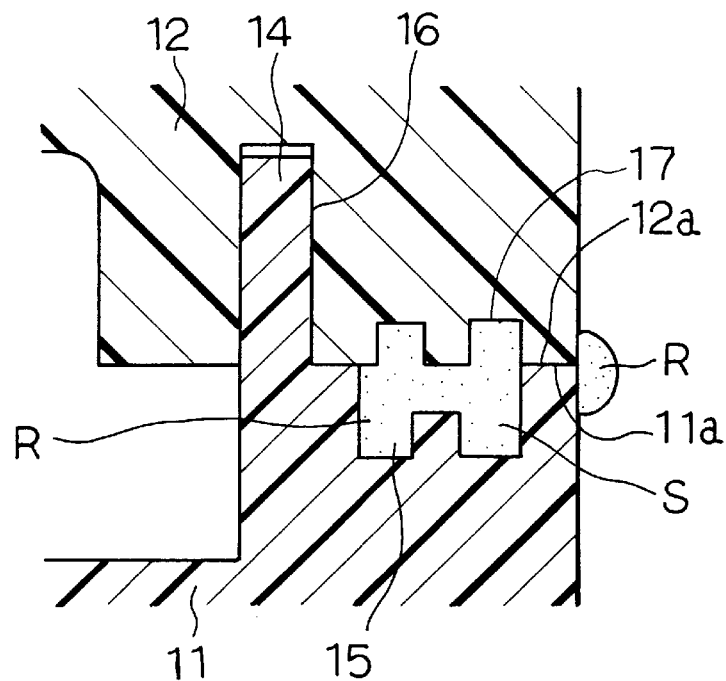
FIG. 3 is an enlarged sectional view of a portion A indicated in FIG. 2 according to the first embodiment of the present invention.

In FIG. 3, a wall portion 14 keeping constant height is formed on the radially inner-most circumference of an abutting surface 11a of case body 11 to extend toward case cover 12. In addition, an indented groove 15 is formed outside wall portion 14. Indented groove 15 has a bottom having a rectangular concavo-convex cross section. On the other hand, a deep groove 16 for receiving wall portion 14 and an indented groove 17 forming sealant filling space S at the time of abutment with indented groove 15 are provided on an abutting surface 12a of case cover 12. The bottom of indented groove 17 has also a concavo-convex cross section. For instance, each indented groove 15 and 17 has 2 mm width, and the concavo-convex portion has 0.7 mm width and so as height.

Figure 4:
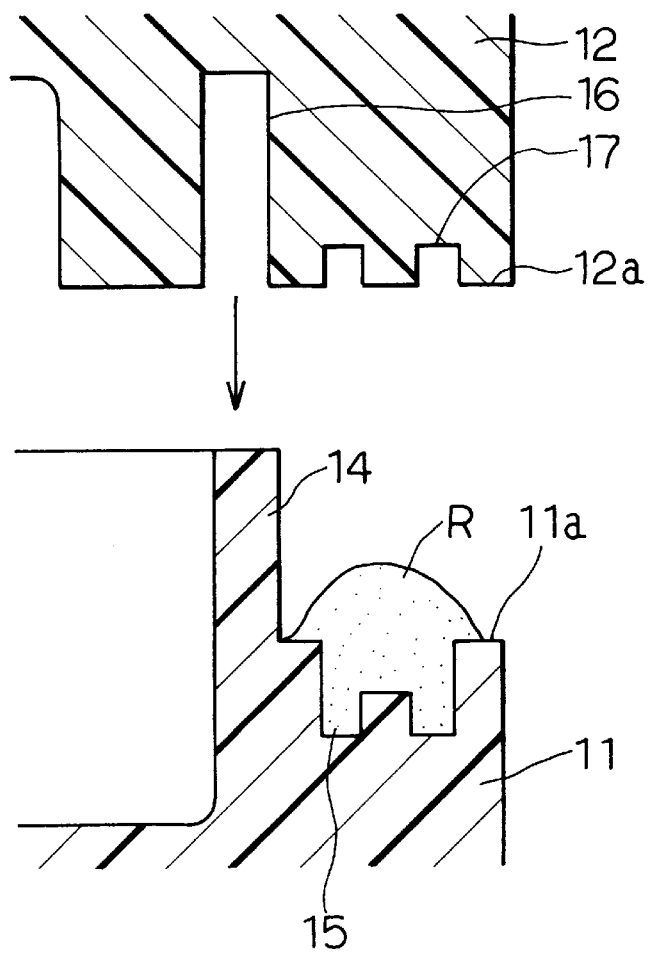
FIG. 4 is an exploded sectional view of portion A according to the first embodiment of the present invention.

In this kind of water-proofing structure, as shown in FIG. 4, butyl rubber R is pasted as sealant onto abutting surface 11a of case body 11. In this case, since the appropriate amount of the rubber for pasting is difficult to adjust, a presumably larger amount than the capacity of sealant filling space is pasted. When case cover 12 is capped from the upper side onto case body 11, abutting surfaces 11a and 12a contact each other and sealant filling space S is formed by the closed indented grooves 15 and 17. Thus, butyl rubber R is filled into sealant filling space S (shown in FIG. 3). At this stage, an excessive butyl rubber R is pushed out from the case and flows along the radially outer surface of wall portion 14 to the upper direction. However, as long as the enough height is secured for wall portion 14, there is no possibility of the rubber flowing to the inside of case 1 by overrunning wall portion 14. The height of wall portion 14 is 3.22 mm, for example.

According to the water-proofing structure of the present invention, since the inflow of the excessive butyl rubber R into the inside of case 1 is assuredly prevented by wall portion 14, there is no possibility of the malconduction of electrical contacts 61 and 62 due to the sealant adhesion. Also, since the concavo-convex portions are formed on the inner wall surfaces of sealant filling space S filled with butyl rubber R, an enough contacting area for abutting surfaces 11a and 12a with butyl rubber R sandwiched therebetween, can be secured within a limited space. Therefore, even if there occurs changes of the inside pressure in the case in accordance with the temperature changes, there is no possibility of water inflow into the case from outside.

Figure 5:
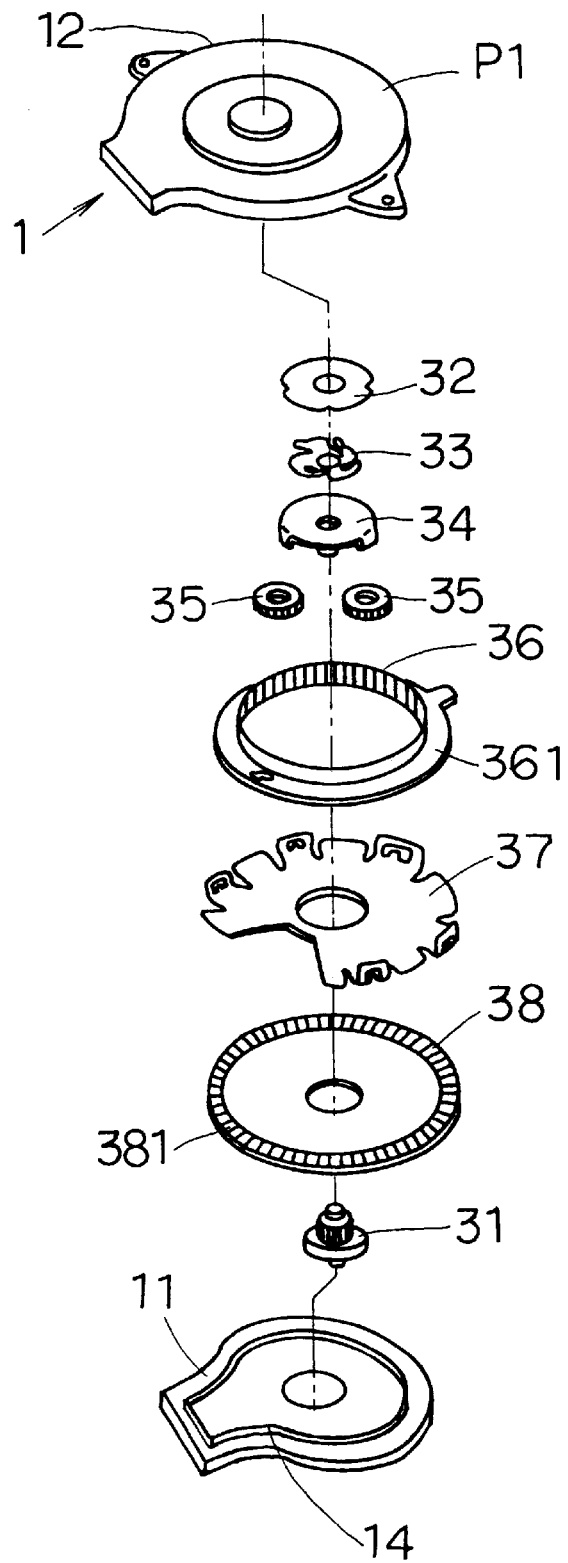
FIG. 5 is a perspective exploded view of a gear case to which a water-proofing structure according to a second embodiment of the present invention is applied.

The water-proofing structure according to the present invention also can be applied to a gear case 1 having only a gear containing portion P1 but no circuit containing portion P2 (FIG. 1) as shown in FIG. 5.

Not only the butyl rubber but also other liquid sealants may be used likewise. It is not always necessary to form deep groove 16 on case cover 12 for receiving wall portion 14, but simply providing a wall surface for contacting with the outer surface of wall portion 14 will be enough. Further, the concavo-convex portion may be provided only in one of the indented grooves 15 and 17.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A water-proofing structure for a case comprising:

a case body having an abutting surface;

a case cover having an abutting surface for abutment with said abutting surface of said case body;

sealant enclosing portions formed on said abutting surface of said case body and said abutting surface of said cover respectively, said sealant enclosing portions defining a sealant filling portion;

a sealant capable of flowing and filling in said sealant filling portion when said abutting surfaces of said case body and said case cover are moved into an abutting position; and a wall portion disposed nearer to a center of said case than said sealant enclosing portions for preventing said sealant overflowing from said sealant filling portion from flowing into said case body and said case cover.

2. A water-proofing structure for a case according to claim 1, wherein:

said sealant enclosing portions are an indented grooves formed on each of said abutting surfaces of said case body and said case cover; and a concavo-convex portion is formed on each bottom of said indented grooves.

3. A water-proofing structure for a case according to claim 1, wherein:

said wall portion extends from said case body toward said case cover.

4. A water-proofing structure for a case according to claim 1, wherein:

said sealant is an adhesive sealant.

5. A water-proofing structure for a case comprising:

a case body having an abutting surface;

a case cover having an abutting surface for abutment with said abutting surface of said case body;

sealant enclosing portions formed on said abutting surface of said case body and said abutting surface of said cover respectively, said sealant enclosing portions defining a sealant filling portion;

a sealant filled in said sealant filling portion; and a wall portion disposed nearer to a center of said case than said sealant enclosing portions for preventing said sealant overflowing from said sealant filling portion from flowing into said case body and said case cover;

wherein said wall portion extends from said case body toward said case cover; and wherein said case cover is formed with a groove portion which receives said wall portion therein.

6. A water-proofing structure for a case according to claim 1, wherein:

said sealant enclosing portions are indented grooves formed on at least one of said abutting surfaces of said case body and said case cover; and a concavo-convex portion is formed on a bottom of said indented grooves.

7. A water-proofing structure for a case according to claim 6, wherein:

said indented grooves are formed on said abutting surface of said case body; and said wall portion extends from said case body toward said case cover.

8. A water-proofing structure for a case comprising:

a case body having an abutting surface;

a case cover having an abutting surface for abutment with said abutting surface of said case body;

sealant enclosing portions formed on said abutting surface of said case body and said abutting surface of said cover respectively, said sealant enclosing portions defining a sealant filling portion;

a sealant filled in said sealant filling portion; and a wall portion disposed nearer to a center of said case than said sealant enclosing portions for preventing said sealant overflowing from said sealant filling portion from flowing into said case body and said case cover;

wherein said sealant enclosing portions are indented grooves formed on at least one of said abutting surfaces of said case body and said case cover;

wherein a concavo-convex portion is formed on a bottom of said indented grooves;

wherein said wall portion extends from said case body toward said case cover; and wherein said case cover is formed with a groove portion which receives said wall portion therein.

9. A water-proofing structure for a case comprising:

a case body having a body-side abutting surface including a concavo-convex shaped section;

a case cover having a cover-side abutting surface including a concavo-convex shaped section, said cover-side abutting surface being in contact with said body-side abutting surface; and an adhesive sealant filled between said body-side abutting surface and said cover-side abutting surface thereby to seal said case body and said case cover leaving no substantial space between said body-side abutting surface and said cover-side abutting surface.

10. A water-proofing structure according to claim 9, wherein:

said case body has a body-side groove formed on said body-side abutting surface to provide the concavo-convex shaped section;

said case cover has a cover-side groove formed on said cover-side abutting surface to provide concavo-convex shaped section;

said body-side groove and said over-side groove provide a sealant filling space; and said adhesive sealant filling in said sealant filling space.

11. A water-proofing structure according to claim 10, further comprising:

a wall disposed nearer to a center of said case than said sealant filling space and extending perpendicularly from one of said body-side abutting surface and said cover-side abutting surface thereby to restrict said adhesive sealant from overflowing from said sealant filling space into said case body and said case cover.

12. A water-proofing structure according to claim 11, wherein an electric part is provided within said case body and said case cover.

13. A water-proofing structure according to claim 11, wherein:

said wall extends from said case body toward said case cover.

14. A water-proofing structure according to claim 11, wherein:

a groove is formed on the other of said body-side abutting surface and said cover-side abutting surface to receive therein said wall.

* * * * *